July 8, 1924.
W. I. SHORT
PISTON
Filed Sept. 28, 1921
1,500,853
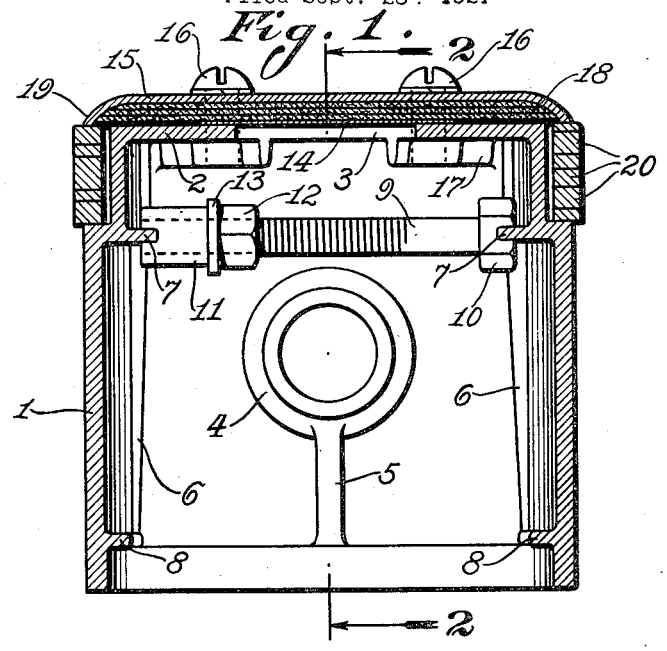
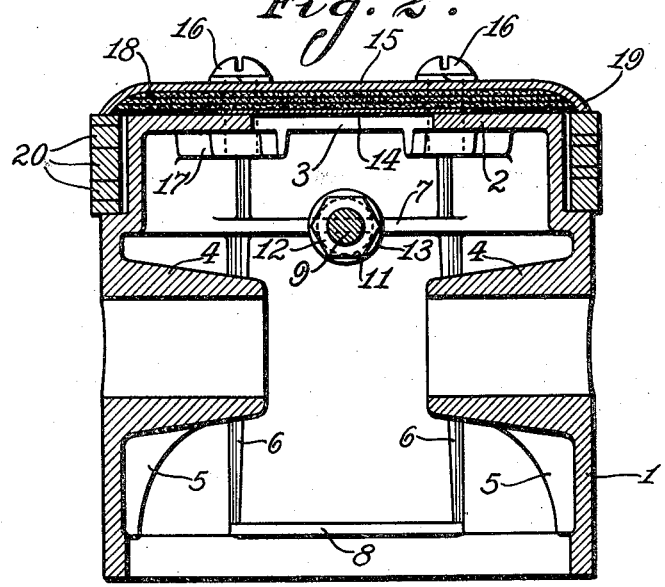
Inventor:
WILLIAM I. SHORT,
By John H. Bruninga,
His Attorney.

Patented July 8, 1924.

1,500,853

UNITED STATES PATENT OFFICE.

WILLIAM I. SHORT, OF CLAYTON, MISSOURI.

PISTON.

Application filed September 28, 1921. Serial No. 503,845.

*To all whom it may concern:*

Be it known that I, WILLIAM I. SHORT, a citizen of the United States, and residing at Clayton, St. Louis County, Missouri, have invented the new and useful Improvement in Pistons, of which the following is a specification.

This invention relates to pistons, and more particularly to trunk pistons designed especially for operation in internal combustion engines.

A trunk piston is provided with a wrist pin bearing in order to form a cross head as well as the piston structure. Accordingly it is subjected to side thrusts which cause the piston to wear on its sides laterally of the wrist pin bearing. This wear is, however, greatest near the closed or head end of the piston.

One of the objects of this invention, therefore, is to provide a piston which may be expanded diminishingly from its closed to its open end.

Another object of this invention is to provide a piston which is adapted for adjustment from the head end thereof without requiring its removal from the cylinder.

In trunk pistons the rings are usually carried at the head or closed end thereof. On account of the unusual conditions to which pistons and the packing thereof are, however, subjected, especially in gas engines, the packing groove or grooves or the packing or both will frequently wear to such an extent as to require new packing rings and in many cases a new piston.

Another object of this invention, therefore, is to provide a piston having means for taking up the wear of the packing and of the groove or grooves thereof.

Further objects will appear from the detail description taken in connection with the accompanying drawing in which:

Figure 1 is a longitudinal vertical section of a piston embodying this invention; and Figure 2 is a section on line 2—2, Figure 1.

Referring to the accompanying drawing, the piston comprises a shell provided with side walls 1 and an end wall 2, which is perforated at 3. The shell is provided with bosses 4 forming wrist pin bearings and these bosses are further connected with the side walls by ribs 5. The shell may be constructed of any suitable material, such as aluminum or its alloys or cast iron.

Extending along the shell and inside thereof and located on opposite sides of the wrist pin bearing are pairs of ribs 6, each pair being connected at the upper ends by a bridge 7 and at the lower ends by a bridge 8, the bridges 7 and 8 following the contour of the shell. The ribs 6 taper to the upper end of the shell and the bridge 7 is deeper than the bridge 8.

Arranged to cooperate with the bridges 7 is an expanding device comprising a threaded screw 9 provided with a head 10 which is slotted to take over one bridge 7. The threaded end of the screw extends loosely into a sleeve 11 which is also slotted to take over the other bridge 7. Threaded on the screw is a nut 12 which cooperates with the sleeve 11, a washer being interposed.

The opening 3 is closed by a plate 14 of metal or any other suitable material which is held in place by a cap 15 secured by screws 16 threaded into the end 2 of the shell, these screws also passing through enlarged portions of ribs 17 radiating from the opening 3 and merging into the side walls of the piston. Layers of insulating material 18 in the form of asbestos or any other suitable material are provided between the cap 15 and the piston shell, and it will be noted that this cap has a flange 19 which takes against the piston rings 20 in the groove in the piston, while the cap itself is otherwise out of metallic contact with the shell.

By manipulation of the nut 12, outward pressure will be applied to the rib 7 so as to cause the walls of the piston to expand outwardly on opposite sides of its wrist pin bearings. In view of the fact, however, that the pressure is applied near the head end of the piston and in view of the fact that tapering ribs 6 are provided which extend from the bridges 7 to the open end of the shell, the shell will be diminishingly expanded from its closed to its open end as is required in practice. This expansion of the shell may be obtained without removal of the piston from the cylinder, for by simply removing the cylinder head and the cap 15 with its shims 18 and plate 14, the expanding means is accessible from the head or closed end of the piston as a wrench may be inserted through the opening 3 to effect such adjustment. This adjustment may be obtained as close as the piston will work and when once adjusted there is no danger of further expansion, in view of the fact that the adjusting means is not only inside of the piston where it is subjected to the splash of the oil, but the adjusting means is away from the head as it is protected by the insulation 18 between the cap 15 and the shell. The wearing sides of the piston are not only adjusted but maintained adjusted by the ribs and bridges.

In case the piston rings or the groove should become worn so as to cause the packing rings to become loose, the wear can be taken up by leaving out one or more, or by substituting thinner shims 18 between the cap and the piston shell. This enables the axial width of the groove to be accurately established providing for sufficient looseness of the ring to allow them to expand in view of the fact that the body of the cap is spaced from the shell end by these shims. The insulating shims also act to insulate the cap from the piston shell, thereby enabling the piston to fit the cylinder more closely.

It is obvious that various changes may be made in the details of construction without departing from the spirit of this invention; it is, therefore, to be understood that this invention is not to be limited to the specific details shown and described.

Having thus described the invention, what is claimed is:

1. A trunk piston comprising, a continuous shell having a wrist pin bearing, and means for expanding said shell transversely of said bearing and diminishingly from its closed to its open end.

2. A trunk piston comprising, a continuous shell having a wrist pin bearing, and means for applying outward pressure to the wall of said shell at its closed end and in a direction transversely of said bearing, adapted to expand the shell diminishingly from its closed to its open end.

3. A trunk piston, comprising, a shell having a wrist pin bearing, ribs extending along said shell, and means for applying pressure to said ribs at the closed end of said shell.

4. A trunk piston, comprising, a shell having a wrist pin bearing, ribs extending along said shell and tapering to the open end thereof, and means for applying pressure to the said ribs at the closed end of said shell.

5. A trunk piston, comprising, a shell having a wrist pin bearing, a pair of ribs extending along said shell on each side thereof, a bridge connecting each rib pair, and means for applying pressure to said bridges.

6. A trunk piston, comprising, a shell having a wrist pin bearing, a pair of ribs extending along said shell on each side thereof and tapering to the open end of said shell, a bridge connecting each rib pair, and means for applying pressure to said bridges.

7. A trunk piston, comprising, a shell having a wrist pin bearing, a pair of ribs extending along said shell on each side thereof, bridges connecting each rib pair at the ends of said shell, and means for applying pressure to a pair of opposite bridges.

8. A trunk piston, comprising, a continuous shell having a wrist pin bearing, and means for expanding said shell transversely of said bearing, said means being accessible from the head end of said shell.

9. A trunk piston, comprising, a continuous shell having a wrist pin bearing, and means accessible from the head end of said shell adapted to expand the same diminishingly from its closed to its open end.

10. A trunk piston, comprising, a shell having a wrist pin bearing, means for expanding said shell transversely of said bearing, and means adapted to render said adjusting means accessible from the head end of said shell.

11. A trunk piston, comprising, a shell having a wrist-pin bearing and provided with a groove for loosely receiving expansible packing rings, a recessed cap on said shell, and removable plates within said cap, whereby the extent of said groove may be adjusted.

12. A trunk piston, comprising, a shell having a wrist-pin bearing and provided with a groove for loosely receiving expansible packing rings, a recessed cap on said shell, and an insulating plate in said recess adapted to retard the transfer of heat to said shell.

In testimony whereof I affix my signature this 16th day of September, 1921.

WILLIAM I. SHORT.